United States Patent [19]

Hans

[11] Patent Number: 4,786,237

[45] Date of Patent: Nov. 22, 1988

[54] INDUCTION IMMERSION PUMP, PARTICULARLY FOR ALUMINUM

[75] Inventor: Rainer Hans, Bergisch-Gladbach, Fed. Rep. of Germany

[73] Assignee: Interatom International Atomreaktorbau GmbH, Bergisch-Gladbach, Fed. Rep. of Germany

[21] Appl. No.: 430,543

[22] Filed: Sep. 30, 1982

[30] Foreign Application Priority Data

Oct. 21, 1981 [DE] Fed. Rep. of Germany ....... 3141774

[51] Int. Cl.$^4$ ........................................... H02K 44/00
[52] U.S. Cl. .................................................... 417/50
[58] Field of Search ............................. 417/50; 310/11

[56] References Cited

U.S. PATENT DOCUMENTS 4,174,190  11/1979  Craig et al. ........................... 417/50

FOREIGN PATENT DOCUMENTS 1120079  12/1961  Fed. Rep. of Germany .
  25152   2/1982  Japan ..................................... 417/50
 268174   7/1970  U.S.S.R. ............................... 417/50
 880454  10/1961  United Kingdom .................. 417/50

*Primary Examiner*—Edward K. Look
*Attorney, Agent, or Firm*—Herbert L. Lerner; Laurence A. Greenberg

[57] ABSTRACT

Induction immersion pump, including a temperature-resistant housing extended above and below a given liquid level, a channel disposed in the housing at least partially below the given liquid level, the channel having a substantially rectangular cross section with wide and narrow outer surfaces, a comb-shaped coil core being disposed in the housing and having teeth pointing toward the channel, copper induction coils disposed on the coil core at the wide outer surface of the channel, and at least one feed line and at least one discharge line for inert gas disposed in the housing above the given liquid level.

4 Claims, 1 Drawing Sheet

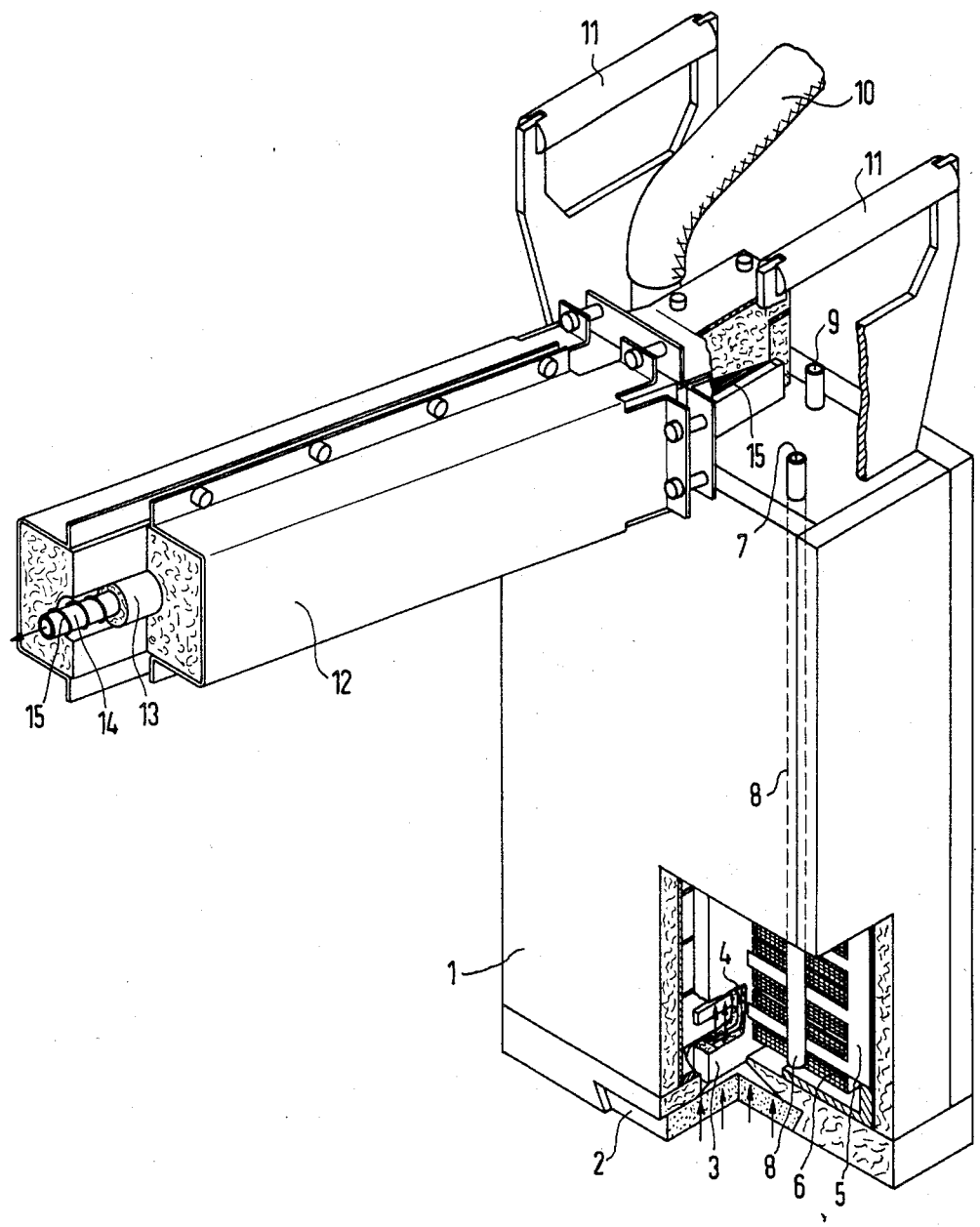

INDUCTION IMMERSION PUMP, PARTICULARLY FOR ALUMINUM

BACKGROUND OF THE INVENTION

1. Field of the Invention:

The present invention relates to an induction immersion pump for hot liquid metals, especially for aluminum, having a channel or canal being immersed in the liquid and having a rectangular cross section, a comb-shaped coil core having teeth pointing toward the channel, and induction coils disposed on the coil core outside the wide sides of the channel. Many embodiments of induction pumps for liquid metals are known, in particular those which have a liquid-metal canal with a rectangular cross section that is disposed between magnet frames with comb-like profiles and coil assemblies mounted thereon. It is therefore an objective of the invention to improve such a pump for use as an immersion pump.

2. Description of the Prior Art:

At present, two methods are mainly used for taking liquid metal from a container, continuously or by the batch. One possibility is ladling over the edge of the container, but manual labor or elaborate mechanisms are necessary therefor. The second possibility is controlled drainage through an opening at the bottom of the melt container. The control is exercised in such a case by a slider or even an electromagnetic pump apparatus. However, if the shut off device fails, there is the risk of emptying the container, for which reason openings below the liquid level in larger containers should be dispensed with. An immersion pump combines the advantages of both methods. It is immersed from above into the melt and pumps the liquid metal continuously or by the batch over the edge of the container.

In the event of a failure, such as due to a power failure, only the pumping is interrupted. An electromagnetic immersion pump can be remotely controlled and permits accurate metering.

In earlier attempts to construct induction pumps for liquid aluminum as immersion pumps, for example, it was impossible to obtain satisfactory results. The reasons therefor are as follows (a) Because of the high temperatures which naturally occur at the coils in immersion pumps for hot fluids, the windings had to be made of a temperature-resistant material, which led to large losses because of the poor conductivity of such materials. If copper was used as coil material, a lower loss was obtained, but the coils would oxidize at this temperature and would become unusable after a short time.

(b) It was impossible to maintain the magnetic properties of the coil core, depending on the operating condition, since the Curie temperature in the vicinity of the pumping canal was exceeded.

(c) In pumping of aluminum, it was impossible to obtain an aluminum jet free of bubbles, which would be desirable for a sensible employment of immersion pumps.

SUMMARY OF THE INVENTION

It is accordingly an object of the invention to provide an induction immersion pump which overcomes the hereinafore-mentioned disadvantages of the heretofore-known devices of this general type, and to produce an immersion pump, particularly for liquid aluminum, which does not have the above-mentioned disadvantages.

With the foregoing and other objects in view there is provided, in accordance with the invention, an induction immersion pump, particularly for liquid aluminum, comprising a temperature-resistant housing encapsulating internal parts of the pump and being extended above and below a given liquid level, a channel immersed in the liquid disposed in the housing at least partially below the given liquid level, the channel having a substantially rectangular cross section with wide and narrow outer surfaces, a comb-shaped coil core being disposed in the housing and having teeth pointing toward the channel, copper induction coils disposed on the coil core at the wide outer surface of the channel, and at least one feed line and at least one discharge line for inert gas disposed in the housing above the given liquid level. The choice of copper for the coils first of all ensures good conductivity and thereby low losses. The encapsulation of the immersion pump, channel and coils in the housing above and below the liquid level provides protection against the liquid metal and the ambient air, but it alone cannot prevent the penetration of oxygen, and thereby oxidation of the coils. Therefore, the hosuing is additionally flushed with inert gas, preferably nitrogen, so that the oxygen content and the oxidation of the coils are reduced to a minimum. At the same time, the inert gas can also serve for cooling the coils and the coil core, so that overheating is avoided. If the immersion pump is used for liquid aluminum, conditions can be provided for the magnet core and the coils which ensure trouble-free operation.

In accordance with another feature of the invention, the housing has a bottom, and the feed and discharge lines include at least one distribution tube extended in the housing to the vicinity of the housing bottom. Through suitable distribution of the inert gas, and also by optionally branching off a distributor tube at the bottom, optimum flushing and cooling of the critical points can be achieved.

The measures proposed so far already bring about transportation of the liquid metal largely free of bubbles due to constant operating conditions and high output, but these can be improved further since the pumped liquid metal must be brought over the edge of the melt container. Therefore, in accordance with a concomitant feature of the invention, the pump channel has an upper end, and there is a tube having a smaller cross-sectional area than the pump channel being disposed at an angle relative to the pump channel, and an angular transition piece fastened between the upper end of the pump channel and the tube providing a general transition from the pump or flow channel to the tube. This measure, and in particular the reduction of the cross section, causes the pressure at the start of the tube and in the transition piece to be relatively high, so that continuous pumping without bubbles is brought about.

The operation of induction pumps and the possibilities for connecting the coils have already been described in detail in the available literature and are known to anyone skilled in the art. Some basic ideas in this connection can be gathered from the journal "Neue Hütte"- Volume 21, No. 10 of October 1976, Pages 580 to 584 and from the literature mentioned as references therein.

Other features which are considered as characteristic for the invention are set forth in the appended claims.

Although the invention is illustrated and described herein as embodied in an induction immersion pump, particularly for aluminum, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying single figure of the drawing which is a fragmentary, diagrammatic, partially cross-sectional view of an immersion pump according to the invention.

DESCRIPTION OF THE PREFERRED EMBODIMENT:

Referring now in detail to the single figure of the drawing, there is seen a housing 1 which is insensitive to high temperatures and is impervious to oxygen as far as possible. Contained in the housing 1 is an induction pump apparatus which is known per se and is formed of a pump channel 3 having a rectangular cross section 4 and induction coils 6 which are disposed on the outside of the pump channel 3 at the wide sides thereof and are wound on a comb-shaped coil core 5 with teeth pointing toward the rectangular channel. The pumping channel is preferably formed of graphite and is covered on the underside of the housing bottom by a ceramic plate 2 which is permeable to liquid aluminum. The housing 1 of the pump apparatus is encapsulated in such a way that neither liquid aluminum nor atmospheric oxygen can penetrate into it, to any extent. In order to flush out oxygen contents which may nevertheless penetrate into the interior of the housing, an inlet opening 7 is disposed on the top of the housing. An inert gas such as nitrogen, can be conducted downward into the pump housing from the inlet opening through a distributor tube 8. The inert gas leaves again through a discharge nozzle 9. Through a suitable construction of the distributor tube and appropriate placement, the inert gas can also serve for cooling the coils and the coil cores. The leads of the coils are brought into the interior of the housing through protective tubing 10. The entire pump ca be lifted from the melt by means of handles 11. At the upper end of the housing, the rectangular pump channel is bent off by means of a formed piece by an angle of not quite 90° and is merged into a round tube section. The cross-sectional area of the tube 14 is smaller than the cross-sectional area of the pump channel. The tube 14 is surrounded by insulating material 12, 13. The tube 14 extends over the edge of an aluminum melting container being used and the tube is heated by a heater winding 15.

The foregoing is a description corresponding to German Application P No. 31 41 774.4, dated Oct. 21, 1981, the International priority of which is being claimed for the instant application and which is hereby made part of this application. Any discrepancies between the foregoing specification and the aforementioned corresponding German application are to be resolved in favor of the latter.

I claim:

1. Induction immersion pump, comprising a temperature-resistant housing extended above and below a given liquid level, a non-metallic channel disposed in said housing at least partially below said given liquid level, said channel having a substantially rectangular cross section with wide and narrow outer surfaces and an upper end, a comb-shaped coil core being disposed in said housing at said wide outer surface of said channel and having teeth pointing toward said channel, copper induction coils disposed on said coil core at said wide outer surface of said channel, at least one feed line and at least one discharge line for inert cooling gas disposed in said housing above said given liquid level, and a tube communicating with said upper end of said channel, said tube being bent off from said channel by an angle of less than 90°.

2. Immersion pump according to claim 1, wherein said housing has a bottom, and said feed and discharge lines include at least one distribution tube extended in said housing to the vicinity of said housing bottom.

3. Immersion pump according to claims 1 or 2, wherein said tube has a smaller cross-sectional area that said pump channel an including an angular transition piece fastened between said upper end of said pump channel and said tube providing a gradual transition from said pump channel to said tube.

4. Immersion pump according to claim 1, including an inert gas disposed in said feed and discharge lines.

* * * * *